United States Patent
Hu et al.

(10) Patent No.: US 11,404,940 B2
(45) Date of Patent: Aug. 2, 2022

(54) BRUSHLESS DIRECT CURRENT MOTOR

(71) Applicant: Zhongshan Broad-Ocean Motor Co., Ltd., Zhongshan (CN)

(72) Inventors: Zhaoxiang Hu, Zhongshan (CN); Jianhui Li, Zhongshan (CN); Mingpan Pan, Zhongshan (CN); Chao Wang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 74 days.

(21) Appl. No.: 17/037,588

(22) Filed: Sep. 29, 2020

(65) Prior Publication Data
US 2021/0013781 A1    Jan. 14, 2021

Related U.S. Application Data

(63) Continuation-in-part of application No. PCT/CN2019/076275, filed on Feb. 27, 2019.

(30) Foreign Application Priority Data

Jul. 14, 2018 (CN) .......................... 201821114105.X
Sep. 14, 2018 (CN) .......................... 201821502933.0

(51) Int. Cl.
| | |
|---|---|
| *H02K 11/215* | (2016.01) |
| *H02K 5/15* | (2006.01) |
| *H02K 9/22* | (2006.01) |
| *H02K 21/22* | (2006.01) |
| *H02K 11/30* | (2016.01) |
| *H02K 5/18* | (2006.01) |

(52) U.S. Cl.
CPC ............. *H02K 11/215* (2016.01); *H02K 5/15* (2013.01); *H02K 5/18* (2013.01); *H02K 9/22* (2013.01); *H02K 11/30* (2016.01); *H02K 21/22* (2013.01); *H02K 2211/03* (2013.01)

(58) Field of Classification Search
CPC .......... H02K 11/215; H02K 5/15; H02K 9/22; H02K 21/22
USPC ........................................... 310/64, 68 B, 71
See application file for complete search history.

(56) References Cited

FOREIGN PATENT DOCUMENTS

| CN | 201393163 Y | | 1/2010 | |
|---|---|---|---|---|
| CN | 203504359 U | | 3/2014 | |
| CN | 204615524 U | | 9/2015 | |
| CN | 205265385 U | * | 5/2016 | ............... H02K 1/14 |

(Continued)

*Primary Examiner* — Jose A Gonzalez Quinones
(74) *Attorney, Agent, or Firm* — Matthias Scholl P.C.; Matthias Scholl

(57) ABSTRACT

A brushless DC motor, including a base, an insulation seat, a rotor assembly, a revolving shaft, a stator assembly, a control panel, a Hall circuit board, and an end cover. The revolving shaft is connected to the rotor assembly. The rotor assembly includes a housing and a plurality of magnetic tiles. The housing includes an inner wall and a cavity defined by the inner wall. The plurality of magnetic tiles is disposed on the inner wall. The stator assembly is disposed in the cavity. The base includes a cylindrical sleeve extending from a center of the base to the cavity of the rotor assembly. The stator assembly is connected to the cylindrical sleeve; two ends of the cylindrical sleeve are provided with a first bearing and a second bearing, respectively; and two ends of the revolving shaft are supported by the first bearing and the second bearing, respectively.

12 Claims, 10 Drawing Sheets

(56) References Cited

FOREIGN PATENT DOCUMENTS

| | | | | |
|---|---|---|---|---|
| CN | 205265385 U | | 5/2016 | |
| CN | 108233660 A | * | 6/2018 | ........... H02K 11/215 |
| CN | 108233660 A | | 6/2018 | |
| CN | 208424164 U | | 1/2019 | |
| JP | 2010200419 A | | 9/2010 | |
| KR | 1020080029132 A | | 4/2008 | |

* cited by examiner

BRUSHLESS DIRECT CURRENT MOTOR

CROSS-REFERENCE TO RELATED APPLICATIONS

This application is a continuation-in-part of International Patent Application No. PCT/CN2019/076275 with an international filing date of Feb. 27, 2019, designating the United States, now pending, and further claims foreign priority benefits to Chinese Patent Application No. 201821114105.X filed on Jul. 14, 2018, and to Chinese Patent Application No. 201821502933.0 filed on Sep. 14, 2018. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a brushless direct current (DC) motor.

Conventionally, a brushless DC motor comprises a control panel, three Hall circuit boards, and a rotor assembly comprising a plurality of magnetic tiles. The three Hall circuit boards are disposed on the control panel through an extension socket and a plurality of contact pins. In addition, the distance between the three Hall circuit boards and the plurality of magnetic tiles is inconstant, and thus the magnetic induction data of each hall element is inaccurate.

SUMMARY

The disclosure provides a brushless DC motor, comprising a base, an insulation seat, a rotor assembly, a revolving shaft, a stator assembly, a control panel, a Hall circuit board, and an end cover.

The revolving shaft is connected to the rotor assembly; the rotor assembly comprises a housing and a plurality of magnetic tiles; the housing comprises an inner wall and a cavity defined by the inner wall; the plurality of magnetic tiles is disposed on the inner wall; the stator assembly is disposed in the cavity; the base comprises a cylindrical sleeve extending from a center of the base to the cavity of the rotor assembly; the stator assembly is connected to the cylindrical sleeve; two ends of the cylindrical sleeve are provided with a first bearing and a second bearing, respectively; and two ends of the revolving shaft are supported by the first bearing and the second bearing, respectively; the end cover is disposed on the base and an accommodation cavity is formed therebetween; the base comprises a first through hole; the first through hole is disposed on an inner side of the plurality of magnetic tiles; the insulation seat is disposed in the accommodation cavity; the insulation seat comprises a protrusion extending towards the cavity and a recess corresponding to the protrusion; the protrusion is disposed in the first through hole; the control panel is disposed on the insulation seat; the Hall circuit board is disposed in the recess; at least one Hall element is secured to the Hall circuit board; and the at least one Hall element faces towards the protrusion.

In a class of this embodiment, three Hall elements are secured to the Hall circuit board.

In a class of this embodiment, the recess comprises a bottom surface; the bottom surface comprises three square grooves and two positioning columns disposed between every two adjacent square grooves; the Hall circuit board is supported by the two positioning columns; and the three Hall elements are disposed in the three square grooves, respectively.

In a class of this embodiment, the base comprises a second through hole; the insulation seat comprises a first surface facing the control panel and a second surface facing the base; the first surface comprises a fixed platform provided with three third through holes; the second surface comprises a convex frame corresponding to the fixed platform in position; the convex frame is disposed in the second through hole; the stator assembly comprises a contact pin; one end of the contact pin passes through the three third through holes to electrically connect to the control panel.

In a class of this embodiment, the convex frame comprises a first part and a second part; the second part is disposed outside the cylindrical sleeve; and a height of the second part is larger than a height of the first part.

In a class of this embodiment, the cylindrical sleeve comprises an outer surface provided with a step; the stator assembly comprises a stator core abutting against the step; a part of the step is sunken to form a groove to collect aluminum scraps.

In a class of this embodiment, the control panel comprises a heating element; the end cover comprises a first end face and a second end face; the first end face comprises a cooling platform attached to the heating element.

In a class of this embodiment, the second end face of the end cover comprises a plurality of radiating ribs.

In a class of this embodiment, the base comprises an annular side wall and a plurality of mounting columns secured to the annular side wall; each mounting column comprises a first screw hole; the insulation seat comprises a plurality of openings corresponding to the plurality of mounting columns in positions; the end cover is secured to the annular side wall and fixed on the plurality of mounting columns through a plurality of first screws.

In a class of this embodiment, the base further comprises a plurality of supporting seats abutting against the plurality of mounting columns, respectively; each supporting seat comprises a second screw hole; the insulation seat comprises a rim and a plurality of supporting platforms corresponding to the plurality of supporting seats in positions; each supporting platform comprises a fourth through hole; the control panel is supported by the plurality of supporting platforms; the control panel comprises a plurality of mounting holes; the control panel, the insulation seat, and the base are fixed together through a plurality of second screws passing through the plurality of mounting holes, the fourth through hole, and the second screw hole in order.

In a class of this embodiment, the inner wall of the housing comprises a bracket; the bracket comprises a plurality of T-shaped columns; and the plurality of magnetic tiles each is disposed between every two adjacent T-shaped columns.

The following advantages are associated with the brushless DC motor of the disclosure.

1. The end cover is disposed on the base and an accommodation cavity is formed therebetween; the base comprises a first through hole; the first through hole is disposed on an inner side of the plurality of magnetic tiles; the insulation seat is disposed in the accommodation cavity; the insulation seat comprises a protrusion extending towards the cavity and a recess corresponding to the protrusion; the protrusion is disposed in the first through hole; the control panel is disposed on the insulation seat; the Hall circuit board is disposed in the recess; at least one Hall element is secured to the Hall circuit board; and the at least one Hall element faces towards the protrusion. The control board and the Hall circuit board is easy to install, and the distance between each hall element and a corresponding magnetic tile is consistent, so that the magnetic induction data of each hall element is accurate.

2. The recess comprises a bottom surface; the bottom surface comprises three square grooves and two positioning columns disposed between every two adjacent square grooves; the Hall circuit board is supported by the two positioning columns; and the three Hall elements are disposed in the three square grooves, respectively. This ensures the positioning of the Hall elements more accurate and convenient.

3. The base comprises a second through hole; the insulation seat comprises a first surface facing the control panel and a second surface facing the base; the first surface comprises a fixed platform provided with three third through holes; the second surface comprises a convex frame corresponding to the fixed platform in position; the convex frame is disposed in the second through hole; the stator assembly comprises a contact pin; one end of the contact pin passes through the three third through holes to electrically connect to the control panel. This simplifies the connection of the control panel with the stator assembly.

4. The convex frame comprises a first part and a second part; the second part is disposed outside the cylindrical sleeve; and a height of the second part is larger than a height of the first part. The asymmetric structure ensures the insulation between the contact pin and the bearing seat.

5. The cylindrical sleeve comprises an outer surface provided with a step; the stator assembly comprises a stator core abutting against the step; a part of the step is sunken to form a groove to collect aluminum scraps. This prevents the aluminum scraps from entering the motor and avoids short circuit.

6. The control panel comprises a heating element; the end cover comprises a first end face and a second end face; the first end face comprises a cooling platform attached to the heating element. This improves the heat dissipation efficiency of the control panel.

7. The base further comprises a plurality of supporting seats abutting against the plurality of mounting columns, respectively; each supporting seat comprises a second screw hole; the insulation seat comprises a rim and a plurality of supporting platforms corresponding to the plurality of supporting seats in positions; each supporting platform comprises a fourth through hole; the control panel is supported by the plurality of supporting platforms; the control panel comprises a plurality of mounting holes; the control panel, the insulation seat, and the base are fixed together through a plurality of second screws passing through the plurality of mounting holes, the fourth through hole, and the second screw hole in order. The connection mode ensures the stress of the control panel is balanced thus preventing the deformation.

8. The inner wall of the housing comprises a bracket; the bracket comprises a plurality of T-shaped columns; and the plurality of magnetic tiles each is disposed between every two adjacent T-shaped columns. The T-shaped columns prevents the magnetic tile from detaching from the inner wall.

DETAILED DESCRIPTION

Figure 1:
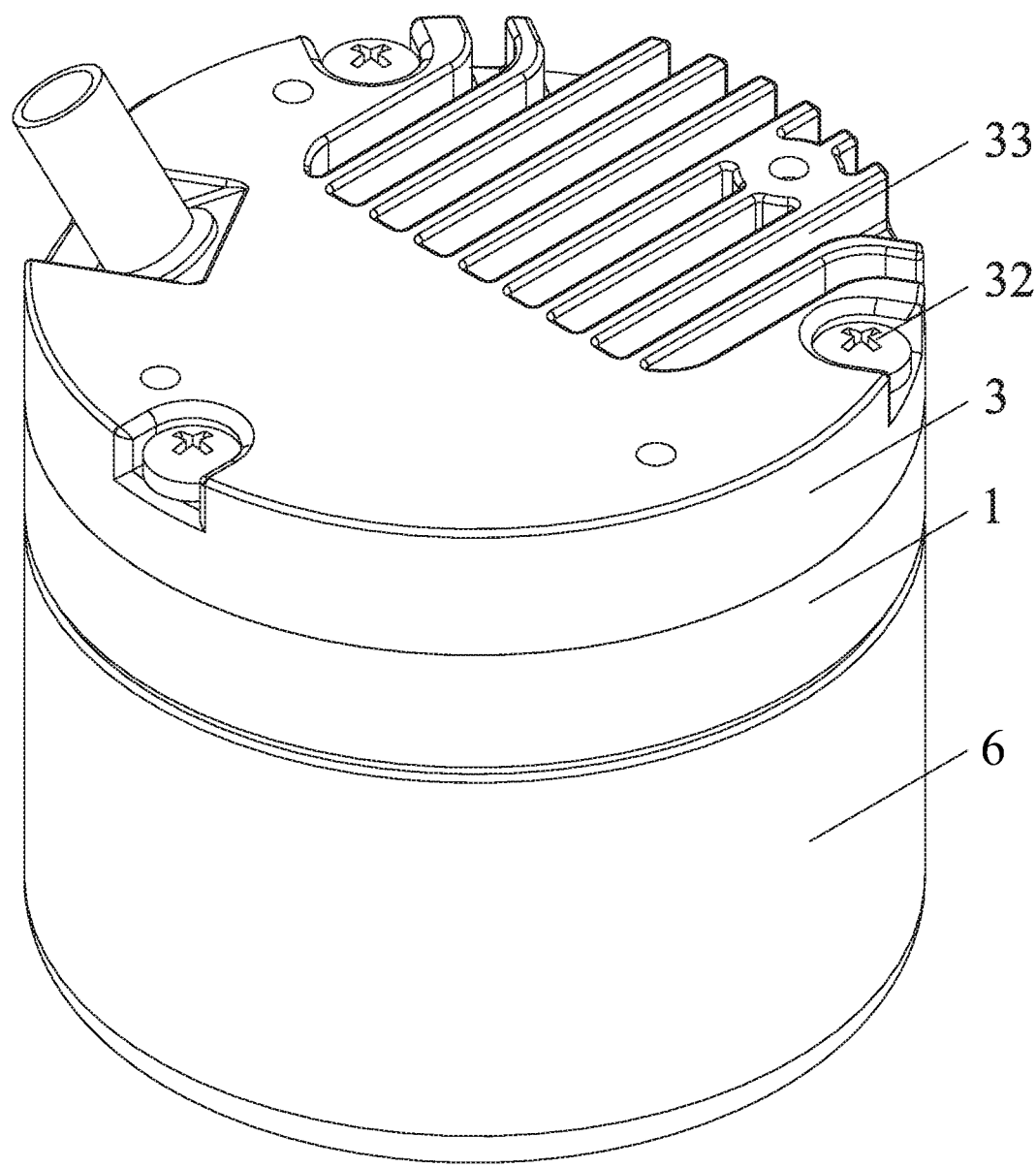
FIG. 1 is a schematic diagram of a brushless DC motor in accordance with one embodiment of the disclosure.
Figure 2:
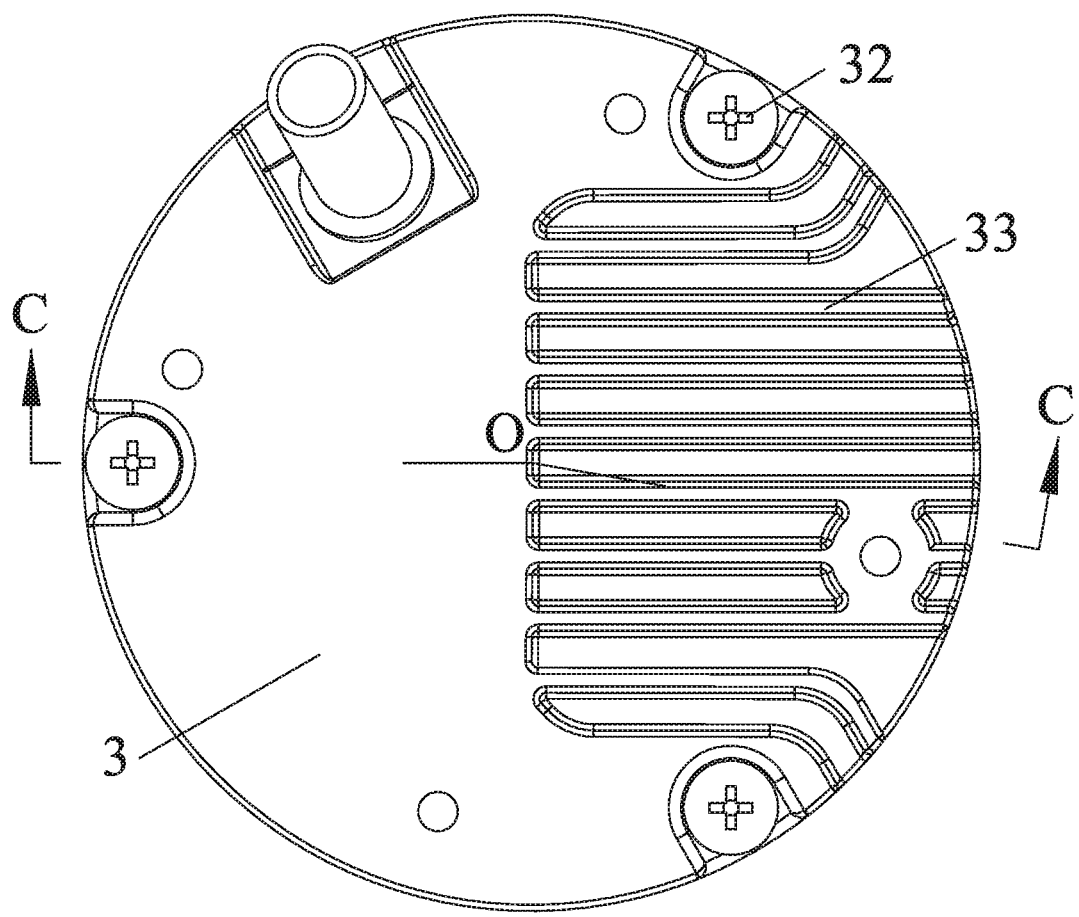
FIG. 2 is a top view of a brushless DC motor in accordance with one embodiment of the disclosure.
Figure 3:
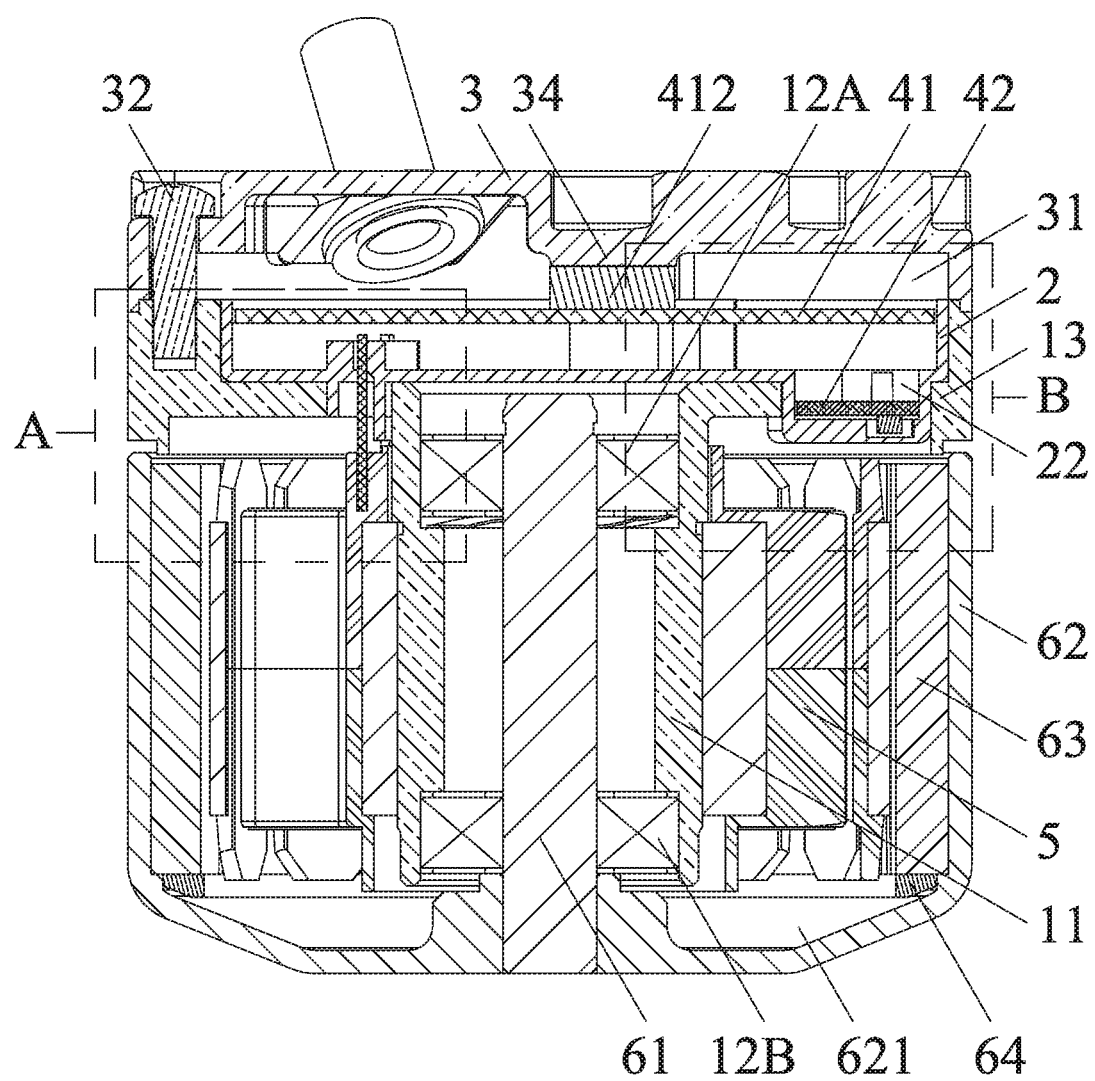
FIG. 3 is a sectional view of a brushless DC motor taken along the line C-O-C in FIG. 2.
Figure 4:
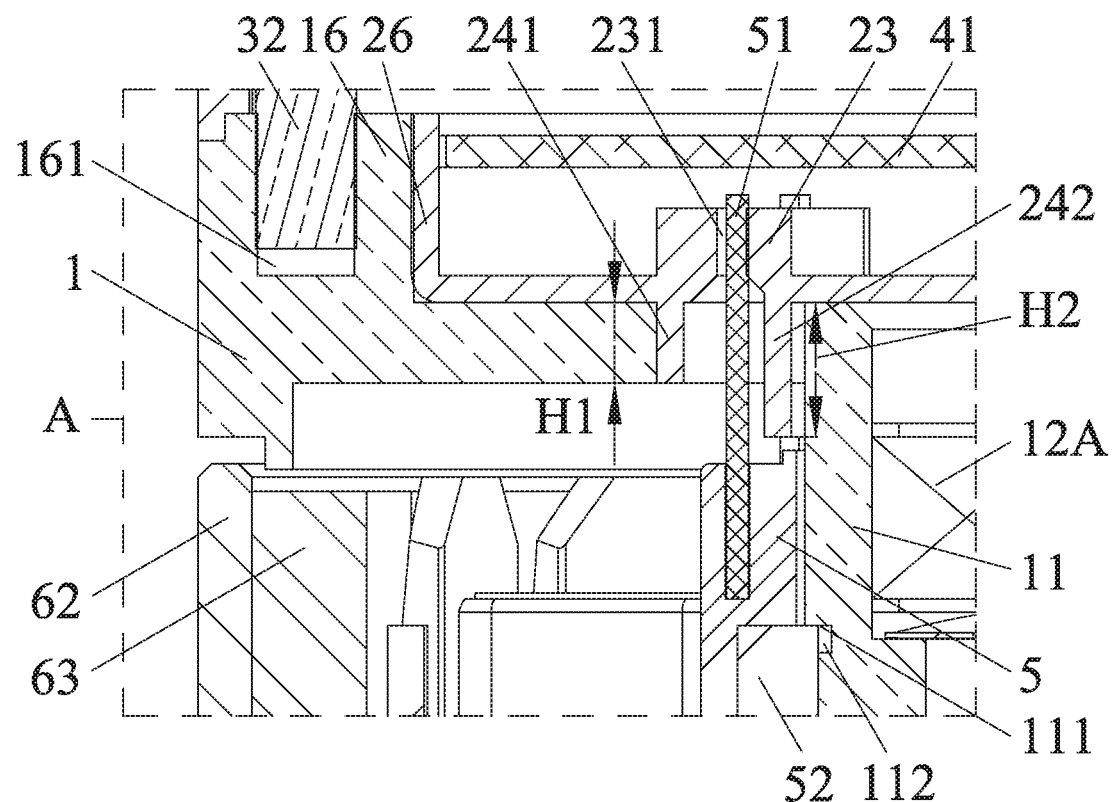
FIG. 4 is an enlarged view of part A in FIG. 3.
Figure 5:
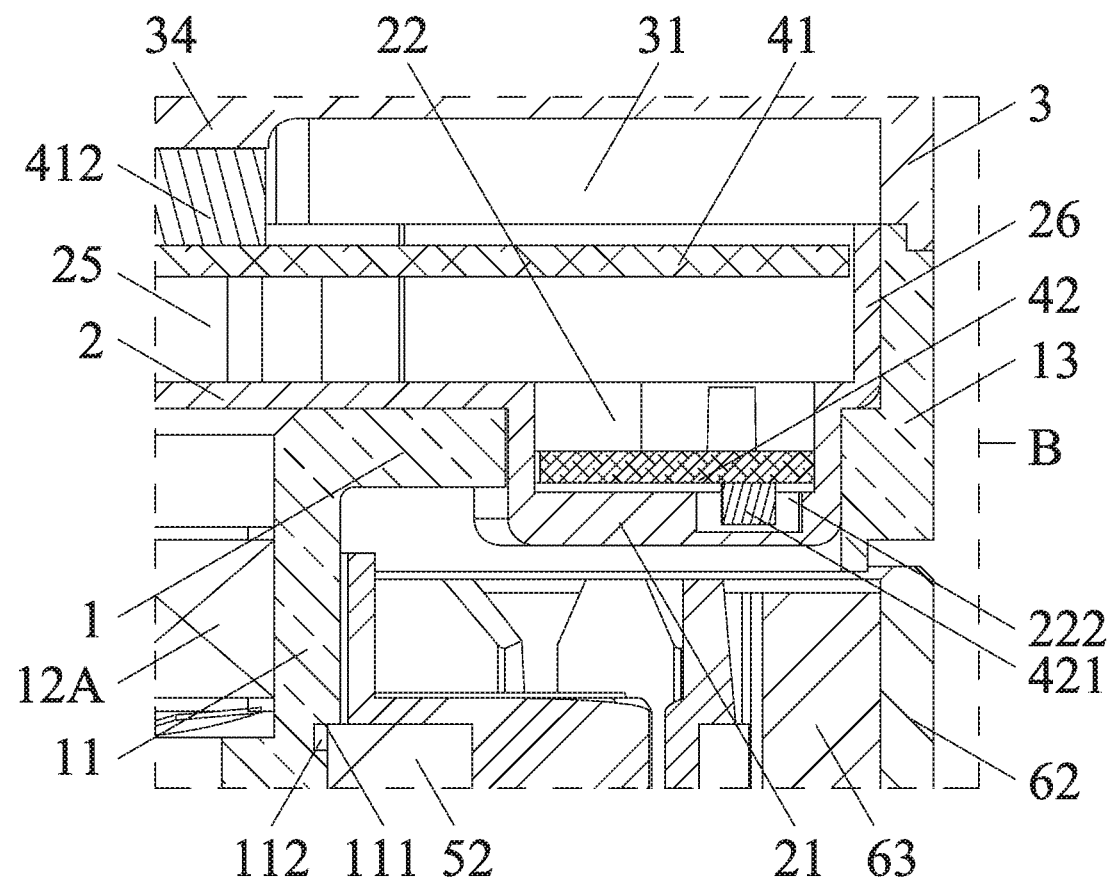
FIG. 5 is an enlarged view of part B in FIG. 3.
Figure 6:
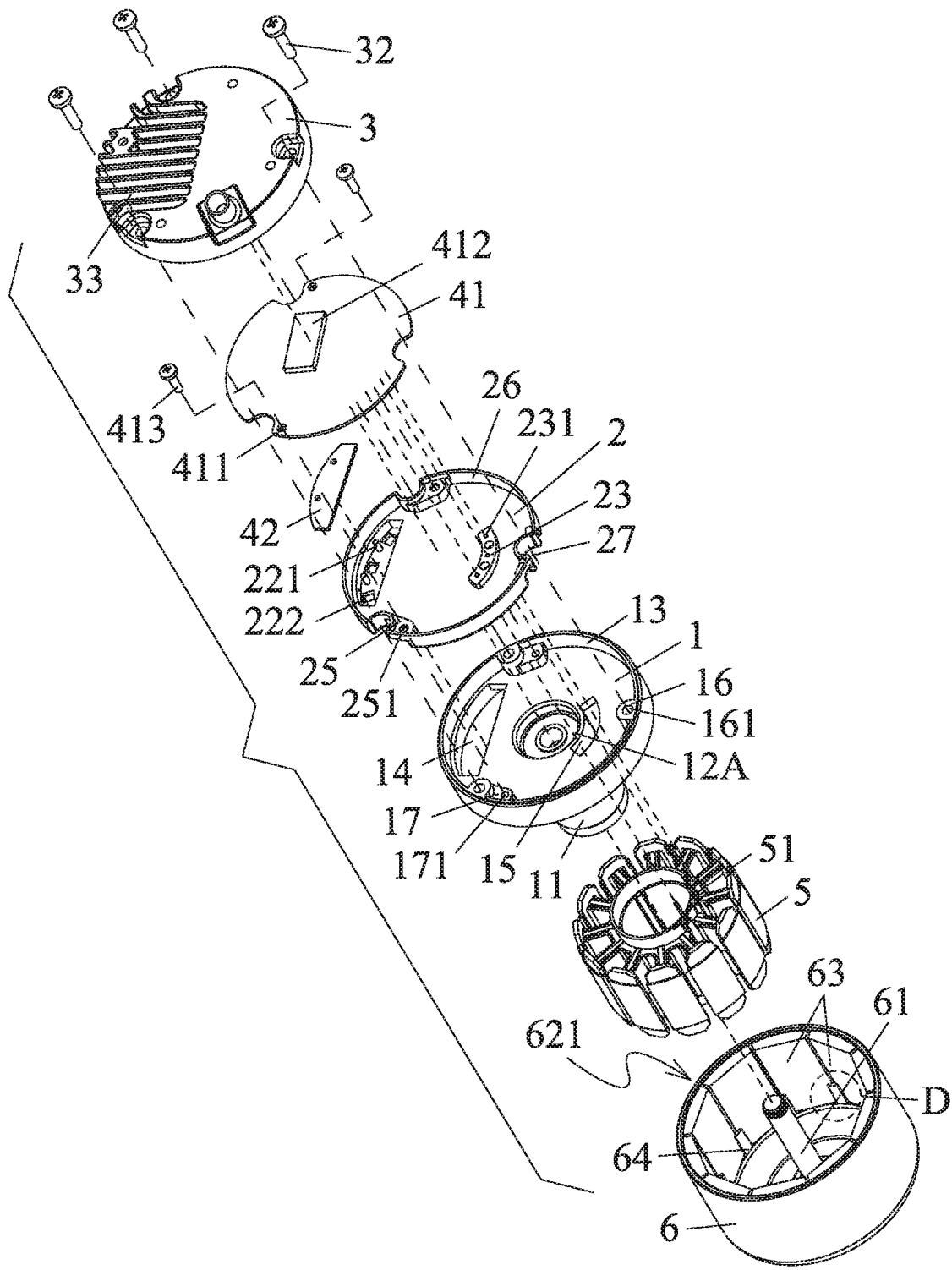
FIG. 6 is an exploded view of a brushless DC motor in accordance with one embodiment of the disclosure.
Figure 7:
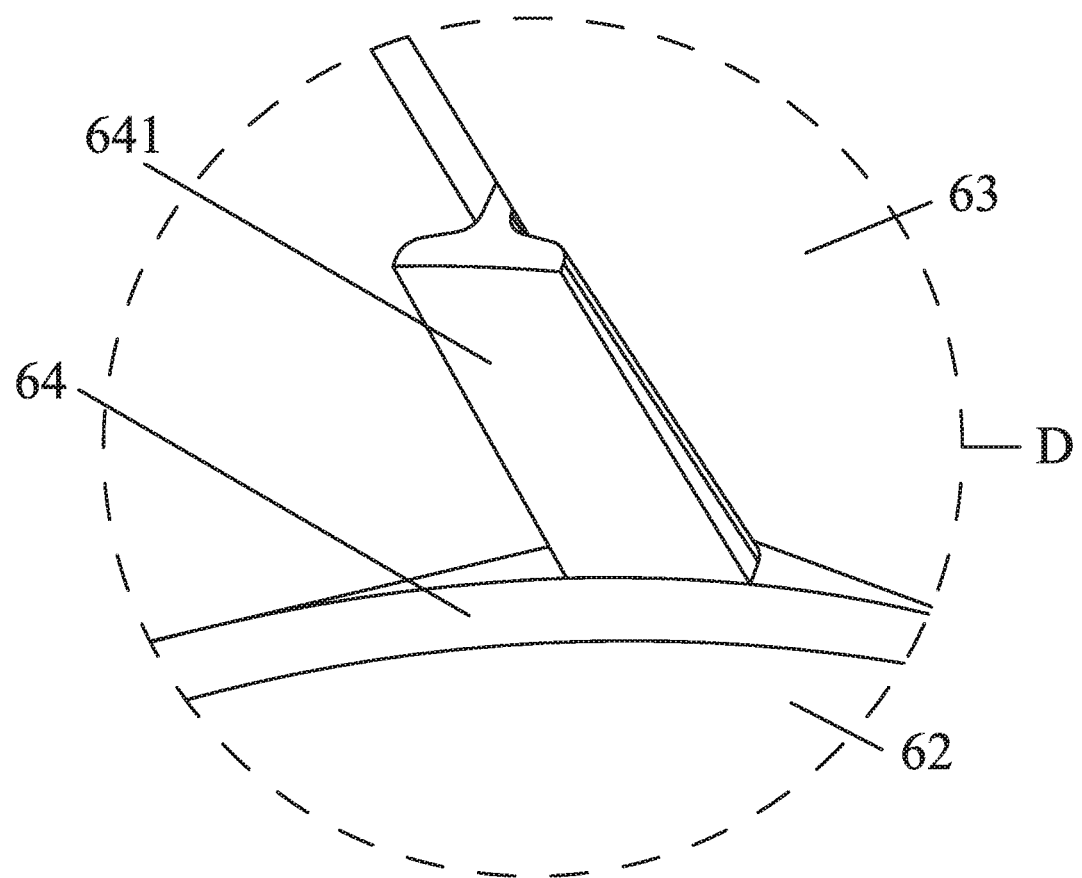
FIG. 7 is an enlarged view of part D in FIG. 6.
Figure 8:
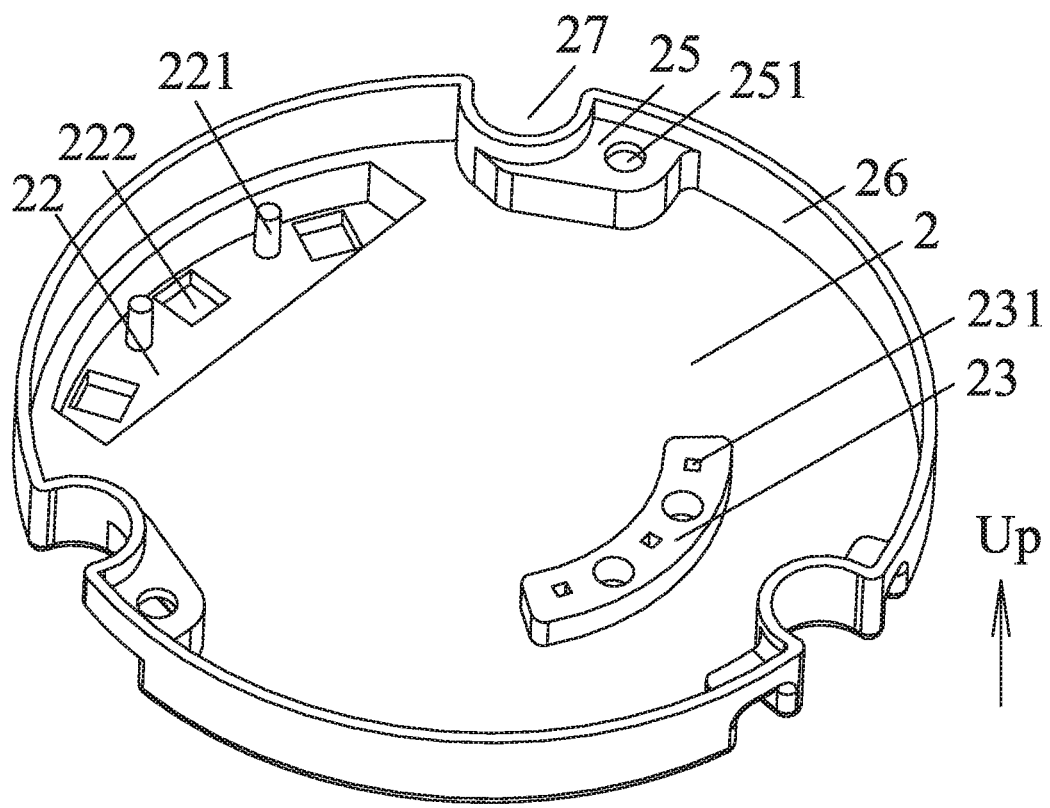
FIG. 8 is a schematic diagram of an insulation seat of a brushless DC motor in accordance with one embodiment of the disclosure.
Figure 9:
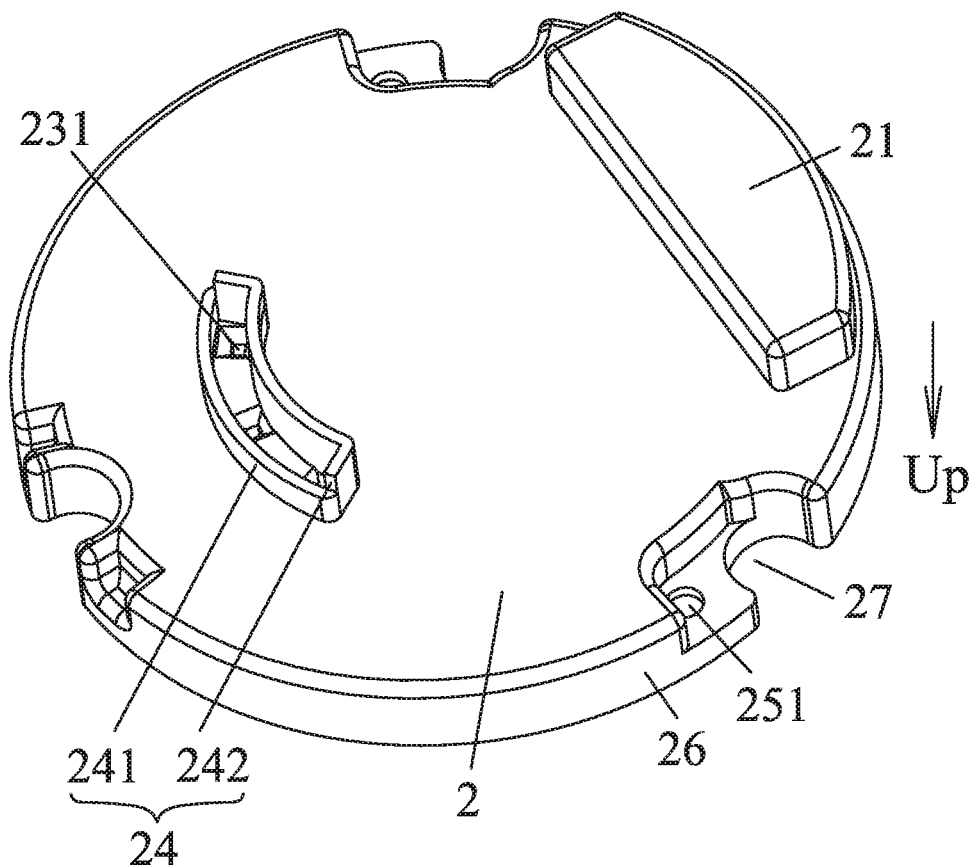
FIG. 9 is a schematic diagram of an insulation seat of a brushless DC motor in another angle of view.

To further illustrate, embodiments detailing a brushless DC motor are described below. It should be noted that the following embodiments are intended to describe and not to limit the disclosure.

Example 1

As shown in FIGS. 1-9, the disclosure provides a brushless DC motor comprising a base 1, an insulation seat 2, a rotor assembly 6, a revolving shaft 61, a stator assembly 5, a control panel 41, a Hall circuit board 42, and an end cover 3. The revolving shaft 61 is connected to the rotor assembly 6; the rotor assembly 6 comprises a housing 62 and a plurality of magnetic tiles 63; the housing 62 comprises an inner wall and a cavity 621 defined by the inner wall; the plurality of magnetic tiles 63 is disposed on the inner wall; the stator assembly 5 is disposed in the cavity 621; the base 1 comprises a cylindrical sleeve 11 extending from a center of the base to the cavity 621 of the rotor assembly; the stator assembly 5 is connected to the cylindrical sleeve 11; two ends of the cylindrical sleeve 11 are provided with a first bearing 12A and a second bearing 12B, respectively; and two ends of the revolving shaft 61 are supported by the first bearing 12A and the second bearing 12B, respectively; the end cover 3 is disposed on the base 1 and an accommodation cavity 31 is formed therebetween; the base comprises a first through hole 14; the first through hole 14 is disposed on an inner side of the plurality of magnetic tiles 63; the insulation seat 2 is disposed in the accommodation cavity 31; the insulation seat 2 comprises a protrusion 21 extending towards the cavity 621 and a recess 22 corresponding to the protrusion 21; the protrusion 21 is disposed in the first through hole 14; the control panel 41 is disposed on the insulation seat 2; the Hall circuit board 42 is disposed in the recess 22; at least one Hall element 421 is secured to the Hall circuit board 42; and the at least one Hall element faces towards the protrusion.

The control board 41 and the Hall circuit board 42 is easy to install, and the distance between each hall element 421 and a corresponding magnetic tile 63 is consistent, so that the magnetic induction data of each hall element 63 is accurate.

In certain embodiments, three Hall elements 421 are secured to the Hall circuit board 42.

In certain embodiments, the recess 22 comprises a bottom surface; the bottom surface comprises three square grooves 222 and two positioning columns 221 disposed between every two adjacent square grooves 222; the Hall circuit board 42 is supported by the two positioning columns 221; and the three Hall elements 421 are disposed in the three square grooves 222, respectively.

The base 1 comprises a second through hole 15; the insulation seat 2 comprises a first surface facing the control panel and a second surface facing the base; the first surface comprises a fixed platform 23 provided with three third through holes 231; the second surface comprises a convex frame 24 corresponding to the fixed platform 23 in position; the convex frame 24 is disposed in the second through hole 15; the stator assembly 5 comprises a contact pin 51; one end of the contact pin 51 passes through the three third through holes 231 to electrically connect to the control panel 41.

The convex frame 24 comprises a first part 241 and a second part 242; the second part 242 is disposed outside the cylindrical sleeve 11; and a height H2 of the second part 242 is larger than a height H1 of the first part 241.

The cylindrical sleeve 11 comprises an outer surface provided with a step 111; the stator assembly 5 comprises a stator core 52 abutting against the step 111; a part of the step 111 is sunken to form a groove 112 to collect aluminum scraps.

The control panel 41 comprises a heating element 412; the end cover 3 comprises a first end face and a second end face; the first end face comprises a cooling platform 34 attached to the heating element 412.

The second end face of the end cover 3 comprises a plurality of radiating ribs 33.

The base 1 comprises an annular side wall 13 and a plurality of mounting columns 16 secured to the annular side wall; each mounting column comprises a first screw hole 161; the insulation seat 2 comprises a plurality of openings 27 corresponding to the plurality of mounting columns 16 in positions; the end cover 3 is secured to the annular side wall 13 and fixed on the plurality of mounting columns 16 through a plurality of first screws 32.

The base 1 further comprises a plurality of supporting seats 17 abutting against the plurality of mounting columns 16, respectively; each supporting seat 17 comprises a second screw hole 171; the insulation seat 2 comprises a rim 26 and a plurality of supporting platforms 25 corresponding to the plurality of supporting seats 17 in positions; each supporting platform 25 comprises a fourth through hole 251; the control panel 41 is supported by the plurality of supporting platforms 25; the control panel 41 comprises a plurality of mounting holes 411; the control panel 41, the insulation seat 2, and the base 1 are fixed together through a plurality of second screws 413 passing through the plurality of mounting holes 411, the fourth through hole 251, and the second screw hole 171 in order.

The inner wall of the housing 62 comprises a bracket 64; the bracket 64 comprises a plurality of T-shaped columns 641; and the plurality of magnetic tiles 63 each is disposed between every two adjacent T-shaped columns 641.

Example 2

Figure 10:
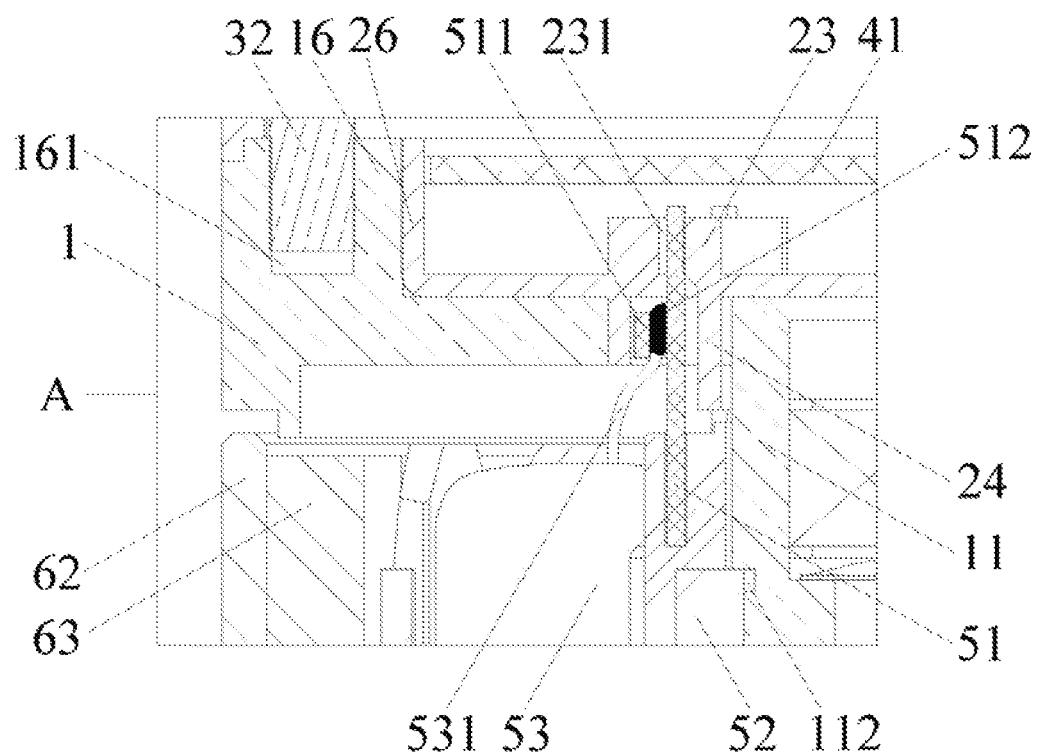
FIG. 10 shows a connection of a contact pin and a coil winding of a brushless DC motor in accordance with another embodiment of the disclosure.

As shown in FIG. 10, the stator assembly 5 in Example 1 comprises a coil winding 53. The middle part of the contact pin 51 is soldered to one end 531 of the coil winding 53 to form a soldering part 512. The soldering part 512 is disposed in the convex frame 24. This improves the insulation effect of the stator assembly.

Optionally, the middle part of the contact pin 51 protrudes to form a clip 511. One end 531 of the coil winding 53 is soldered to the clip 511 to form the soldering part 512. This facilitates the soldering of the coil winding.

It will be obvious to those skilled in the art that changes and modifications may be made, and therefore, the aim in the appended claims is to cover all such changes and modifications.

What is claimed is:

1. A device, comprising:
   a base;
   an insulation seat;
   a rotor assembly;
   a revolving shaft;
   a stator assembly;
   a control panel;
   a Hall circuit board; and
   an end cover;
wherein:
   the revolving shaft is connected to the rotor assembly;
   the rotor assembly comprises a housing and a plurality of magnetic tiles; the housing comprises an inner wall and a cavity defined by the inner wall; the plurality of magnetic tiles is disposed on the inner wall;
   the stator assembly is disposed in the cavity;
   the base comprises a cylindrical sleeve extending from a center of the base to the cavity of the rotor assembly;
   the stator assembly is connected to the cylindrical sleeve;
   two ends of the cylindrical sleeve are provided with a first bearing and a second bearing, respectively; and two ends of the revolving shaft are supported by the first bearing and the second bearing, respectively;
   the end cover is disposed on the base and an accommodation cavity is formed therebetween;
   the base comprises a first through hole and a second through hole; the first through hole is disposed on an inner side of the plurality of magnetic tiles;
   the insulation seat is disposed in the accommodation cavity; the insulation seat comprises a protrusion extending towards the cavity and a recess corresponding to the protrusion; the protrusion is disposed in the first through hole;
   the control panel is disposed on the insulation seat the Hall circuit board is disposed in the recess;
   at least one Hall element is secured to the Hall circuit board; and the at least one Hall element faces towards the protrusion;
   the insulation seat further comprises a first surface facing the control panel and a second surface facing the base;
   the first surface comprises a fixed platform provided with three third through holes;
   the second surface comprises a convex frame corresponding to the fixed platform in position;
   the convex frame is disposed in the second through hole;
   the stator assembly comprises a contact pin; and
   one end of the contact pin passes through the three third through holes to electrically connect to the control panel.

2. The device of claim 1, wherein three Hall elements are secured to the Hall circuit board.

3. The device of claim 2, wherein the recess comprises a bottom surface; the bottom surface comprises three square grooves and two positioning columns disposed between every two adjacent square grooves; the Hall circuit board is supported by the two positioning columns; and the three Hall elements are disposed in the three square grooves, respectively.

4. The device of claim 1, wherein the convex frame comprises a first part and a second part; the second part is disposed outside the cylindrical sleeve; and a height of the second part is larger than a height of the first part.

5. The device of claim 4, wherein the cylindrical sleeve comprises an outer surface provided with a step; the stator assembly comprises a stator core abutting against the step; a part of the step is sunken to form a groove to collect aluminum scraps.

6. The device of claim 5, wherein the control panel comprises a heating element; the end cover comprises a first end face and a second end face; the first end face comprises a cooling platform attached to the heating element.

7. The device of claim 6, wherein the second end face of the end cover comprises a plurality of radiating ribs.

8. The device of claim 7, wherein the base comprises an annular side wall and a plurality of mounting columns secured to the annular side wall; each mounting column comprises a first screw hole; the insulation seat comprises a plurality of openings corresponding to the plurality of mounting columns in positions; the end cover is secured to the annular side wall and fixed on the plurality of mounting columns through a plurality of first screws.

9. The device of claim 8, wherein the base further comprises a plurality of supporting seats abutting against the plurality of mounting columns, respectively; each supporting seat comprises a second screw hole; the insulation seat comprises a rim, and a plurality of supporting platforms corresponding to the plurality of supporting seats in positions; each supporting platform comprises a fourth through hole; the control panel is supported by the plurality of supporting platforms; the control panel comprises a plurality of mounting holes; the control panel, the insulation seat, and the base are fixed together through a plurality of second screws passing through the plurality of mounting holes, the fourth through hole, and the second screw hole in order.

10. The device of claim 9, wherein the inner wall of the housing comprises a bracket; the bracket comprises a plurality of T-shaped columns; and the plurality of magnetic tiles each is disposed between every two adjacent T-shaped columns.

11. The device of claim 1, wherein the stator assembly further comprises a coil winding; a middle part of the contact pin is soldered to one end of the coil winding to form a soldering part; the soldering part is disposed in the convex frame.

12. The device of claim 11, wherein the middle part of the contact pin protrudes to form a clip; and the one end of the coil winding is soldered to the clip to form the soldering part.

* * * * *